Nov. 10, 1931. A. REESE 1,831,137
DIRECTING MEANS FOR AUTOMOBILE SPOTLIGHTS
Filed May 5, 1930  2 Sheets-Sheet 1
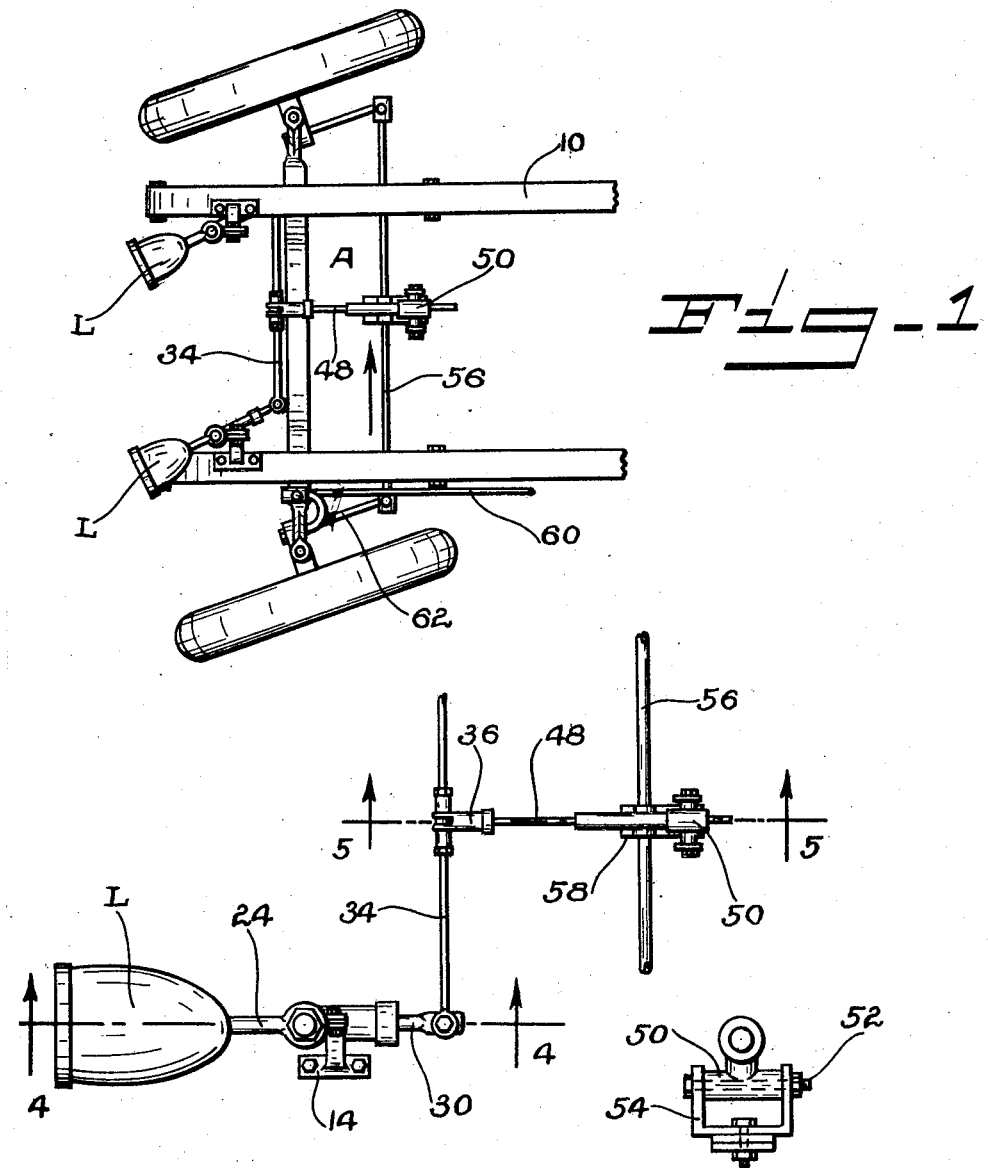
INVENTOR
Aaron Reese
BY
Smith & Tuck
ATTORNEYS

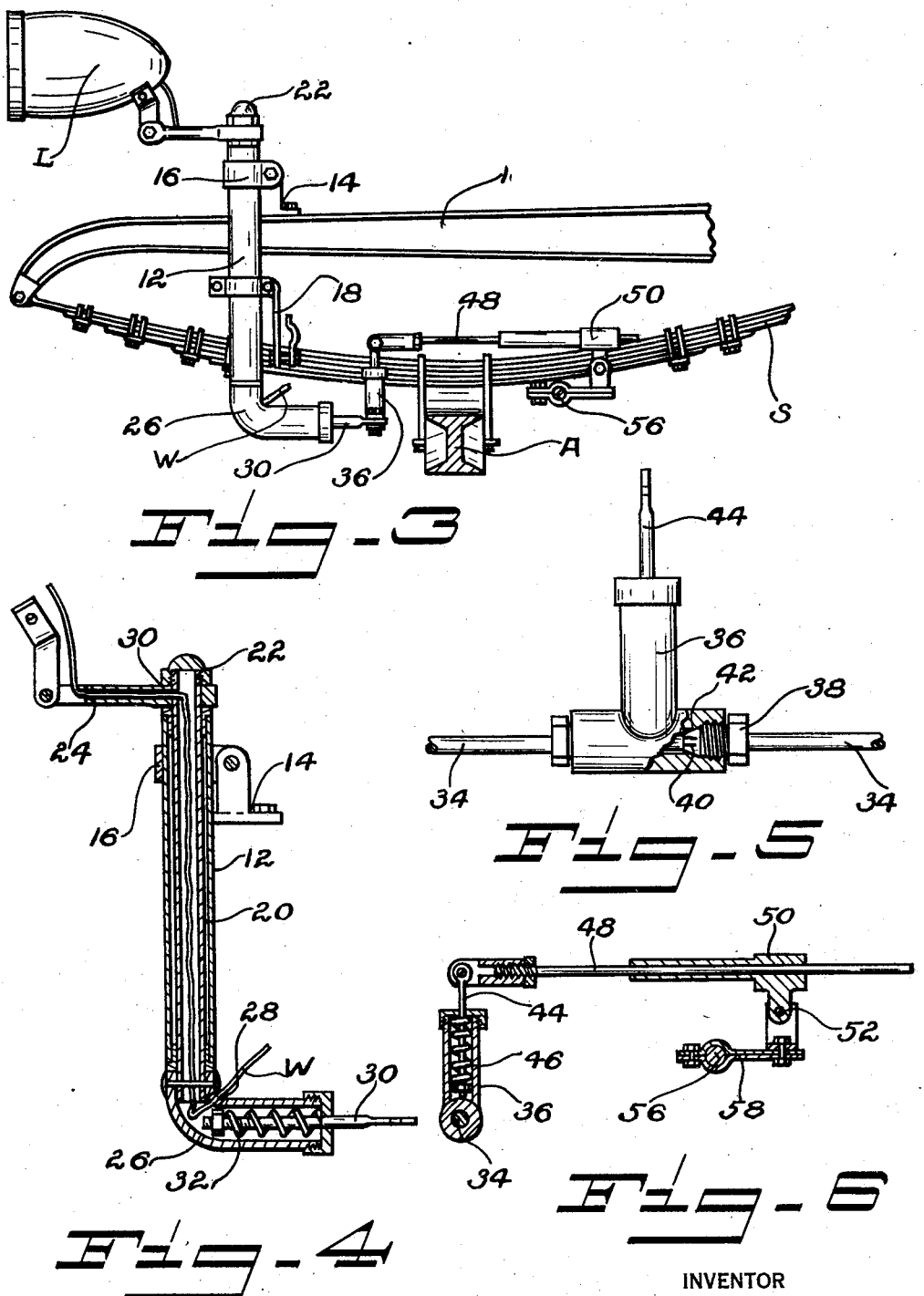

Patented Nov. 10, 1931

1,831,137

UNITED STATES PATENT OFFICE

AARON REESE, OF SEATTLE, WASHINGTON

DIRECTING MEANS FOR AUTOMOBILE SPOTLIGHTS

Application filed May 5, 1930. Serial No. 449,748.

My present invention relates to the art of automotive lighting and more particularly to a directing means for automobile spot lights.

In the past few years numerous arrangements have been devised for the purpose of causing automobile lights to turn in the direction a car is turned. One type of control means upon which a good deal of time has been spent is that wherein the light is fixed rigidly to either the front axle spindle or to the wheel spindle itself. Lights of this character must necessarily turn with the wheel. They cannot be adjusted so as to turn ahead of the wheels in order that they will work when making either right or left hand turns. This type has a further disadvantage that they are not cushioned from the road shocks, and as a result the lights are soon destroyed. The other type is usually mounted upon the chassis proper where they obtained the benefit of the spring action, but in order to connect them to the tie rod, of the running gear, so as to communicate the turning movement of the car thereto, adequate provision is not made to take care of the constant displacement which occurs between the chassis proper and the running gear, in other words the displacement which the springs take care of, therefore:

The principal object of my invention is to provide light directing means whereby the lights may be secured to the spring supported frame of the car and yet obtain its directing effort from the running gear of the car.

A further object is to provide means whereby the directing lights may be made to move further than the wheels during the beginning of the turning movement.

Other and more specific objects will be apparent from the following description taken in connection with the accompanying drawings, wherein:

Figure 1 is a top plan view of certain parts of an automobile chasis, with my lights installed.

Figure 2 is an enlarged plan view of one of my lights as installed.

Figure 3 is a side elevation showing one of my lights, and the connecting means I employ.

Figure 4 is a vertical cross-sectional view through my light supporting standard.

Figure 5 is a fragmentary view showing my coupling rod fixture.

Figure 6 is a fragmentary elevation of a portion of my control means, certain parts being shown in section.

Figure 7 is an elevation of my gimbal rod rest.

Referring to the drawings throughout which like reference numerals indicate like parts, numeral 10 designates the frame of an automobile. Secured to frame 10 is an upright standard 12. The exact manner in which this standard is secured to the automobile will be a function of the design of the automobile in question. In some cars standard 12 can be secured to rods or posts which support the headlights. In others it may be necessary to have a bracket member as 14 secured to the frame as with bolts or rivets, and with a clamp member 16 encircling standard 12 and being secured in clamping relationship to bracket 14. On some cars it is desirable to have an adjustable clamp as 18 which is adjustably secured to standard 12 and adapted to engage convenient cross members, skirts or aprons. Standard 12 is normally formed of tubing, and to have revolvably disposed within the same the light support member. As a matter of convenience this should take the form of a tube as 20. The upper end of tube 20 is provided with a threaded portion adapted to receive the clamping nut 22. Clamped onto the end of tube 20 by net 22 is a light support bracket 24. The exact form of this bracket must be chosen as that most suitable for the light "L" it is intended to support.

The lower end of tube 20 where it projects beyond the end of tube 12, has fixedly secured to it a hollow L shaped member 26. This is provided in certain designs with a wire outlet opening 28. I believe it will be clearly understood that wire "W" has a clear opening through 28 up through the centre of tube 20, out an upper opening in tube 20 at 30, to a point of contact with light "L". Disposed within the L member 26 is a piston rod 30, which is normally urged into L 26 by the compression spring 32. I have shown in my drawings two such complete units. This is the arrangement I find most desirable although I believe it will be clear that a single light unit might be used.

Assuming the two unit installation, I provide a cross coupling rod 34 joining each of the members 30. Adapted to engage the coupling rod 34 is a spring cylinder member 36. This I prefer to have slidable on rod 34 and to have the same provided with means for clamping it to rod 34 at the most desired point. I have shown for this purpose a jam nut 38 which has a split conical portion 40 adapted to engage a similarly cupped surface 42. This provides a very convenient and easily operated clamping means, but is only one of a variety which will occur to those skilled in this type of work.

Slidably secured within cylinder 36 is a shock cylinder rod 44. This feature is probably best shown in Figure 6. The construction of this member is very similar to that formerly described for the L member 26. Compression coil spring 46 surrounds the rod 44 and tends to urge it into the cylinder. Pivotably connected to rod 44 is the lateral motion rod 48. This is adapted to float freely within the long bore of the gimbal member 50. Member 59 is pivotally supported as by the bolt 52 from the U shaped support member 54. This is most clearly shown in Figure 7. Clamping means are then provided which permits adjustable engagement of member 54 with the tie rod 56 of the automobile running gear. The exact method of forming this attachment is a matter of personal preference. I have shown a two pieced clamp member 58 which is adapted to be clamped about rod 56, and the same has proven quite satisfactory.

*Method of operation.*

The method of operation of my device is substantially as follows. Let us assume that the car to which my lights are attached is proceeding in a straight line. Under these conditions my spot lights "L" will normally be adjusted to throw their beams straight ahead, although the adjustability of their mounts permit them to be tilted to the satisfaction of the user.

When a curve is reached the driver, by means of his steering wheel and the connecting steering arm 60, applies the effort necessary to turn the wheels in their new direction. This effort must necessarily be transmitted by means of tie rod 56. As tie rod 56 is moved in the direction indicated by the arrow of Figure 1, the gimbal member 50 is carried with it and as it cannot revolve about a vertical axis, rod 58 is moved bodily in the direction of the arrow. This carries with it the shock cylinder member 36 which in turn moves the coupling rod 34 in the same direction as the arrow. As the coupling rod is pivotably secured to piston rods 30 this action will cause tubes 20 to be partially revolved and thus carry lights "L" to their position as indicated in Figure 1.

The length of rod 30 with reference to the axis of tube 20, is normally selected as being less than the wheel spindle arm 62. This is desirable to the end that the beam of light can be quickly directed upon that portion of the road the car will occupy as it progresses around the turn. This feature, however, means that when the maximum displacement is given to the front wheels of the car there will be a tendency to continue to move rod 34 even though the rod and piston rod 30 are practically in a straight line. It is to overcome this deficiency that I have provided the compression springs 32 so that the extra travel can be taken up by them. Further, this arrangement can take care of unusual distortions of the automobile chassis.

It will be seen by an inspection of Figure 3 that the light standard 12 is fixedly secured to the automobile frame which rests upon the springs "S". Further, clamp 58 is fixedly secured to the tie rod 56 which is a fixed part of the running gear. As the car is driven over uneven ground the spring deflection will cause considerable displacement between these two parts of my device. I have found that at times the axle "A" will rise up to a point where it will strike rod 48. As the road shocks drive this up quite violently I have found it necessary to provide the shock cylinder 36 and the spring 46 to take care of this necessary displacement. Another effect of the spring deflection is to cause an apparent change of length of rod 48. Further, on rounding a curve the changing of the position of rod 34 again causes an apparent change in the length. To take care of these conditions I have provided that rod 48 be permitted to float freely within the bore of member 50, and when observed under conditions of use will be observed to slide back and forth and also the spring deflection will cause a rocking action about pin 52.

The foregoing description and the accompanying drawings clearly disclose a preferred embodiment of my invention but it will be understood that this disclosure is merely illustrative and that such changes in the invention may be made as are fairly within the scope and spirit of the following claims:

What I claim is:

1. A directing means for automobile spot lights consisting of a light supporting bracket; a tubular standard; a light support member revolvably disposed within said standard and arranged to have the supporting bracket secured at its upper end; a hollow L member secured to the lower end of said support member; a piston rod within said L; a coil spring positioned to urge said piston rod into said L; a coupling rod pivotally secured to said piston rod; a lateral motion rod pivotally connected to said coupling rod; a gimbal member in which the lateral motion rod is adapted to float and clamp means securing said gimbal member to the tie rod of an automobile and adapted to prevent rotation of said gimbal member in a horizontal plane.

2. A directing means for automobile spot lights consisting of a light supporting bracket; a tubular standard; a light support member revolvably disposed within said standard and arranged to have the supporting bracket secured at its upper end; a hollow L member secured to the lower end of said support member; a piston rod within said L; a coil spring positioned to urge said piston rod into said L; a coupling rod pivotally secured to said piston rod; a spring cylinder adapted to clamp onto said coupling rod; a cylinder rod axially disposed within said spring cylinder; a coil spring positioned to urge said cylinder rod into said spring cylinder; a lateral motion rod pivotally secured to said cylinder rod; a gimbal member in which the lateral motion rod is adapted to float and clamp means securing said gimbal member to the tie rod of an automobile.

3. A directing means for automobile spot lights consisting of a light supporting bracket; a tubular standard; clamp means adapted to secure said standard to an automobile body; a tubular light support member revolvably disposed within said standard and arranged to have the supporting bracket secured at its upper end; a hollow L member secured to the lower end of said support member; a piston rod within said L; a coil spring positioned to urge said piston rod into said L; a coupling rod pivotally secured to said piston rod; a spring cylinder adapted to clamp onto said coupling rod; a cylinder rod axially disposed within said spring cylinder; a coil spring positioned to urge said cylinder rod into said spring cylinder; a lateral motion rod pivotally secured to said cylinder rod; a gimbal member, capable of movement only in a longitudinal, vertical plane, in which the lateral motion rod is adapted to float and clamp means securing said gimbal member to the tie rod of an automobile.

In witness whereof, I hereunto subscribe my name this 21st day of April, A. D. 1930.

AARON REESE.